(12) United States Patent
Morris et al.

(10) Patent No.: US 10,834,917 B2
(45) Date of Patent: Nov. 17, 2020

(54) METHODS FOR CRYOPRESERVATION OF BIOLOGICAL MATERIALS

(71) Applicant: Asymptote Ltd, Cambridge (GB)

(72) Inventors: George John Morris, Bourn (GB); Stephan James Lamb, Potters Bar (GB)

(73) Assignee: Asymptote Ltd., Cambridge (GB)

(*) Notice: Subject to any disclaimer, the term of this patent is extended or adjusted under 35 U.S.C. 154(b) by 0 days.

(21) Appl. No.: 15/557,320

(22) PCT Filed: Apr. 15, 2016

(86) PCT No.: PCT/GB2016/051055
§ 371 (c)(1),
(2) Date: Sep. 11, 2017

(87) PCT Pub. No.: WO2016/166548
PCT Pub. Date: Oct. 20, 2016

(65) Prior Publication Data
US 2018/0064100 A1    Mar. 8, 2018

(30) Foreign Application Priority Data
Apr. 16, 2015   (GB) .................................. 1506541.0

(51) Int. Cl.
*A01N 1/00*  (2006.01)
*C12M 3/00*  (2006.01)
*A01N 1/02*  (2006.01)

(52) U.S. Cl.
CPC ........... *A01N 1/0263* (2013.01); *A01N 1/021* (2013.01); *A01N 1/0236* (2013.01); *A01N 1/0268* (2013.01)

(58) Field of Classification Search
CPC ..... C12M 21/08; A01N 1/0236; A01N 1/0242
See application file for complete search history.

(56) References Cited

U.S. PATENT DOCUMENTS 5,879,876 A * 3/1999 Wolfinbarger, Jr. ......................... A01N 1/0205
435/1.1
7,939,316 B2    5/2011 Woods et al.
2010/0196873 A1* 8/2010 Woods .................... A01N 1/02
435/2

(Continued)

FOREIGN PATENT DOCUMENTS

WO    2010127158    11/2010
WO    2014091216    6/2014

OTHER PUBLICATIONS

G. J. Morris, E. Acton: "Controlled ice nucleation in cryopreservation—A review", Cryobiology, vol. 66, No. 2; Dec. 12, 2012; pp. 85-92, XPO28989446; ISSN: 0011 2240.

(Continued)

*Primary Examiner* — Nathan A Bowers
(74) *Attorney, Agent, or Firm* — Eversheds Sutherland (US) LLP

(57) ABSTRACT

Broadly speaking, embodiments of the present technique provide apparatus for controlling ice formation, such as during the processes of cryopreservation and freeze drying. In particular, the apparatus provides a mechanism to deliver an ice nucleating material into a biological sample that is to be preserved, without allowing the ice nucleating agent to contact or contaminate the biological matter within the sample.

16 Claims, 10 Drawing Sheets

(56) References Cited

U.S. PATENT DOCUMENTS

| | | | |
|---|---|---|---|
| 2011/0019687 A1 | 1/2011 | Franco et al. | |
| 2012/0040450 A1* | 2/2012 | Clarke | A01N 1/0242 |
| | | | 435/307.1 |
| 2013/0323829 A1* | 12/2013 | Torterella | B01L 3/5025 |
| | | | 435/289.1 |
| 2015/0150241 A1* | 6/2015 | Katkov | A01N 1/0257 |
| | | | 435/307.1 |
| 2017/0181425 A1* | 6/2017 | Burbank | A01N 1/0252 |
| 2017/0265457 A1* | 9/2017 | Suzuki | A01N 1/0268 |

OTHER PUBLICATIONS

International Search Report dated Aug. 2, 2016 for PCT/GB16/051055.

Japanese Office Action for JP Application No. 2017-549331 dated Dec. 2, 2019 (7 pages with English translation).

\* cited by examiner

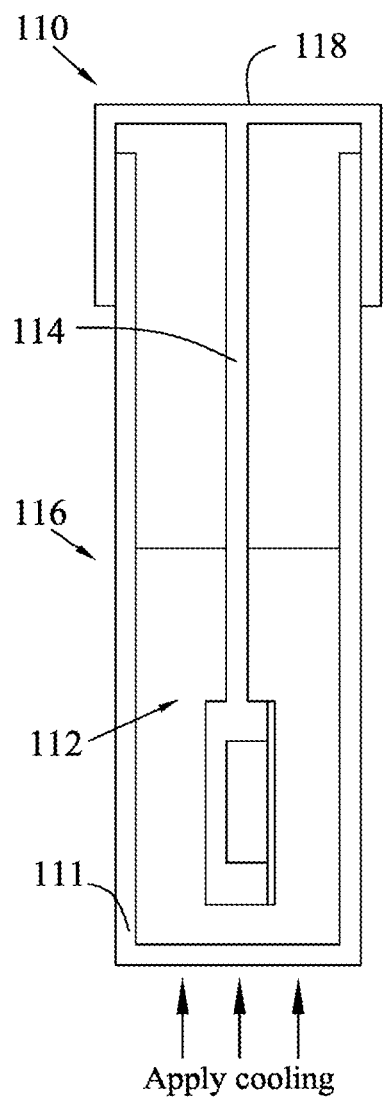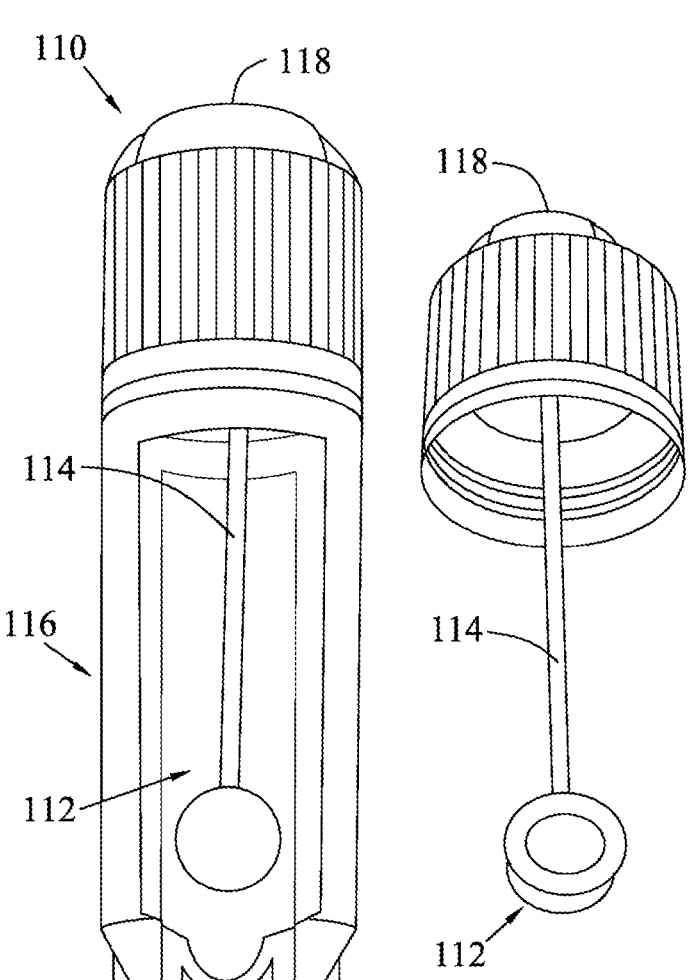
FIGURE 6A
FIGURE 6B

METHODS FOR CRYOPRESERVATION OF BIOLOGICAL MATERIALS

This application claims priority to International Patent Application No. PCT/GB16/051055, filed Apr. 15, 2016, which claims the benefit of GB Application No. 15 06541.0, filed Apr. 16, 2015, the contents of which are incorporated herein by reference.

FIELD OF THE INVENTION

The present invention generally relates to apparatus, methods and systems for controlling ice formation.

BACKGROUND TO THE INVENTION

Biological materials (e.g. cells, vaccines, and proteins) often need to be preserved. For example, biological materials may need to be preserved so that they can be studied or used in scientific experiments at a later point in time. In another example, human oocytes or fertilised embryos may be preserved as part of the in vitro fertilisation (IVF) process. In these examples, it is important that the biological material is preserved in such a way that damage to, or degradation of, the biological material is minimised. Freezing techniques are often used to preserve biological material. There are different ways to freeze biological materials in order to preserve them. For example, cryopreservation is a process in which biological material is frozen and then stored in a frozen state, while freeze drying (lyophilisation) is a process in which a biological sample is frozen and following the freezing step, water is removed from the sample, such that the sample is stored in a dried state.

Cryopreservation is a widely employed technology used to maintain long term viability of biological samples for subsequent application in medicine, biotechnology and veterinary sciences. In order to obtain high viability upon thawing, it is necessary to add protective compounds, also known as cryoprotective additives, and then cool samples at controlled rates. With many cell types it is also necessary to induce ice formation by controlled nucleation rather than allow spontaneous ice nucleation. Samples for cryopreservation are generally placed in specialist cryocontainers, such as:

Straws, which are thin walled tubes typically 2 mm to 4 mm diameter and length up to 140 mm with a capacity of 0.2 ml to 0.5 ml;

Cryovials, which are wider diameter (typically 12.5 mm diameter) short tubes with a capacity of 0.5 ml to 5.0 ml;

Bags, a range of flexible bags with capacity from 5 ml to 1000 ml are available for the cryopreservation of larger volumes; and Multiwell plates, matrix tubes and other SBS (Society for Biomolecular Sciences) formats employed in robotics, high throughput screening, etc.

A range of equipment exists to allow controlled rate freezing of samples in cryocontainers; these devices may employ liquid nitrogen as a cryogen or be cooled by mechanical refrigeration. Additionally, a number of passive cooling devices exist. Following controlled rate freezing, samples are held frozen at low temperature, usually the temperature of liquid nitrogen ($-196°$ C.). At this temperature the cell viability is independent of the period of storage if they survived the cooling stage. When required for use, the samples are thawed rapidly, generally in water baths maintained at $37°$ C., and the cryoprotectant removed.

Freeze drying (lyophilisation) is used extensively in biotechnology, medicine and veterinary science for the long term stabilisation of cells, vaccines, proteins and other bioactive compounds. The freeze drying process is also used to generate structured materials such as scaffolds and matrices for application in regenerative medicine and in the production of novel ceramics. In the freeze drying process, aqueous samples are placed in specialist containers, usually glass vials, and frozen. Commonly, freezing takes place on a cooled shelf in a freeze drier. Following freezing, the local gas pressure is reduced and ice within the frozen sample then sublimates. Following removal of all water from the sample, the vial is warmed under vacuum and sealed. The sample may be distributed at ambient temperatures and is reconstituted by adding water.

Consistent ice nucleation is one of the biggest challenges in cryopreservation. When a liquid is cooled to its melting point, ice nucleation does not occur immediately. The sample may reach $20°$ C. or more beneath its melting point without ice nucleation occurring, a condition known as "supercooling" or "undercooling". As the temperature of the sample reduces, at some point spontaneous ice nucleation will occur and ice will propagate throughout the sample.

Some cell types are robust and are not adversely affected by supercooling. But many cell types can be damaged by excessive supercooling which reduces cell viability after thawing. Due to the variable nature of ice nucleation there can be a wide variation between sample viability. This has various adverse commercial consequences:

1. Companies which guarantee a certain number of viable cells in samples following freezing and thawing have to overfill samples to compensate for the range of viability. If the variability of cells could be decreased a lower cell quantity would be required while still guaranteeing a minimum viable number. This would reduce costs significantly.
2. Aside from the variability of the cells, if the overall viability could be increased the total yield would be higher for the same production costs.
3. High throughput screening using multiwell plates (e.g. 96 well plates and 384 well plates) with frozen and thawed adherent cells is not possible with many of the cell types of interest (hepatocytes, myocytes, stem cell lines etc). The background variability of the cells causes too much 'noise' to identify any meaningful test results. This forces companies to use 'fresh' multiwell plates prepared with adherent cells (i.e. unfrozen) or to seed multiwell plates from a single frozen source. Both options incur significant time and cost while complicating the logistics of multiwell testing.

Ice nucleation in undercooled aqueous solutions may occur by two distinct processes:

1) Homogeneous ice nucleation occurs simply through random density fluctuations within the body of the water, the kinetics of the growth and decay of such molecular clusters and their ability to act as nuclei for crystallisation of ice is well described.
2) Heterogeneous or facilitated ice nucleation is catalysed by a solid or liquid substrate in contact with the water which allows groups of adsorbed water molecules to take up configurations which are able to promote ice formation. In practice, ice nucleation in cryopreservation samples occurs by heterogeneous mechanisms.

In order to reduce the range of ice nucleation temperatures experienced during cryopreservation a number of physical methods have been employed to induce ice nucleation within samples.

1) "Seeding". In early studies of basic cryobiology of mammalian tissue culture cells and later IVF samples were seeded by the physical introduction of a small ice crystal into the undercooled sample. In order to remove the potential of contamination associated with this procedure it is now common practice to induce ice nucleation in the sample by manually generating a cold spot on the outside of the closed cryocontainer and this is still erroneously referred to as "Seeding".
2) Electrofreezing. A high voltage, applied to a metal electrode has been shown to induce ice formation in supercooled water and this has been applied to cryopreservation.
3) Mechanical methods. Shaking, taping, application of ultrasound, can be very effective at inducing ice in undercooled samples. Ultrasonic ice nucleation has been implemented into experimental freeze drying equipment.
4) "Shock cooling" Following conventional slow cooling the sample is cooled rapidly and then further exposed to a complex set of temperature ramps. It is likely that a "cold spot" is formed at the wall of the sample leading to local ice nucleation. A number of suppliers of controlled rate freezers have integrated a shock cooling feature into their equipment.
5) Pressure shift. This method has been applied to freeze drying in which samples are contained in a chamber in which the pressure can be controlled. The samples are pressurised with argon to 28 psig and then cooled to the desired nucleation temperature, the pressure is then reduced to 1 psig to induce nucleation.

These physical methods are difficult to standardise and to integrate into conventional cooling rate equipment and are not compatible with large numbers of samples or with all sample containers. An alternative approach is to use heterogeneous nucleators of ice and to incorporate these into the sample containers or into the suspending liquid. Ice nucleation during cryopreservation has been demonstrated by the inclusion of specific ice nucleating catalysts in the suspending medium.

The ice nucleants examined include the bacterium *Pseudomonas syringae*, crystalline cholesterol, encapsulated silver iodide and feldspar. Although these materials are efficient ice nucleators they are either difficult to make into current good manufacturing practice (cGMP) compliant materials or are not biocompatible and so cannot be used in many applications. Also, following freezing and thawing it is necessary to remove ice nucleants otherwise they can interfere with cell viability and function. Currently, there is no device which allows presentation of the ice nucleant to the sample which avoids these problems.

Accordingly, the present applicant has recognised the need for improved apparatus for controlling ice formation and ice nucleation.

SUMMARY OF THE INVENTION

According to a first aspect of the present invention, there is provided an apparatus for performing ice nucleation, the apparatus comprising: at least one housing, the housing comprising a cavity and at least one permeable housing wall; and an ice nucleating material encapsulated within the cavity.

In embodiments, the housing comprises a first permeable housing wall and a second permeable housing wall. An advantage of having two permeable housing walls is an increased opportunity for liquid to contact the ice nucleating material, which may speed-up the formation of ice crystals. In embodiments, particularly where the ice nucleating material is provided in a powder form, there is likely to be air within the cavity. The permeable housing walls permit liquid to enter the cavity, and air to escape the cavity, such that the cavity is substantially filled with liquid and ice nucleating material. This reduces pressure build-up within the cavity, and increases the amount of liquid that is able to interact with the ice nucleating material (which may thereby speed-up ice formation).

In embodiments, the first permeable housing wall is formed of a first layer, and the second permeable housing wall is formed of a second layer, and wherein the cavity is provided between the first layer and the second layer.

Preferably, the first layer and the second layer are bonded together at least at an edge portion of the housing to encapsulate the ice nucleating material within the cavity, the edge portion surrounding the cavity.

Additionally or alternatively, the housing may be formed of a permeable material layer having a first portion and a second portion, wherein the first permeable housing wall is formed of the first portion of the permeable material layer, and the second permeable housing wall is formed of the second portion of the permeable material layer, and wherein the cavity is provided between the first portion and the second portion of the permeable material layer.

Preferably, the permeable material layer is folded to form the cavity between the first portion and the second portion of the permeable material layer, and wherein the first portion and the second portion are bonded together at least at an edge portion of the housing to encapsulate the ice nucleating material within the cavity, the edge portion surrounding the cavity.

Additionally or alternatively, the housing may comprise a housing body and a permeable housing wall, wherein the cavity is provided between the housing body and the permeable housing wall.

Preferably, the housing body comprises a recess in a surface of the housing body, the recess forming the cavity, and wherein the permeable housing wall is provided over the recess and bonded to the surface of the housing body to encapsulate the ice nucleating material within the cavity.

In alternative embodiments, the housing may comprise a housing body, a first permeable housing wall and a second permeable housing wall, wherein the housing body is a disc comprising a through hole, the through hole forming the cavity, and wherein the first permeable housing wall is provided over the through hole and bonded to a first surface of the housing body, and the second permeable housing wall is provided over the through hole and bonded to a second surface of the housing body, to encapsulate the ice nucleating material within the cavity.

In any of the above embodiments, the apparatus may further comprise a stem coupled to the housing. An advantage of the stem is that it can be used to control the position of the apparatus within a container. Furthermore, the stem improves the ease of removing the apparatus from the container following thawing.

In any of the above embodiments, the apparatus may further comprise a stem having a first end and a second end, wherein the first end is coupled to the housing and the second end is coupled to a lid for a container. Advantageously, this may enable the apparatus to be placed at a pre-determined, consistent position within each container, and further, may improve the ease of removing the apparatus from the container following thawing.

In embodiments, the apparatus comprises a multiwell plate, the multiwell plate comprising: a plurality of wells, and a plurality of integrated housings, wherein an integrated housing of the plurality of integrated housings is integrated into a well of the plurality of wells.

Preferably, the integrated housing comprises: an integrated housing wall; an integrated permeable housing wall; and an integrated cavity between the integrated housing wall and the integrated permeable housing wall, wherein the integrated cavity contains ice nucleating material.

In embodiments, the integrated housing wall is formed from at least a portion of a side wall of the well. Additionally or alternatively, the integrated housing wall is formed from at least a base wall of the well. The base wall of the well may comprise a recess in an inner surface, the recess forming the integrated cavity, and wherein the integrated permeable housing wall is provided over the recess and bonded to the inner surface of the base wall to encapsulate the ice nucleating material within the cavity.

In preferred embodiments, the apparatus comprises an insert plate for a multiwell plate that has a plurality of wells, the insert plate comprising: a plurality of legs arranged in an array, each leg having a first, proximal end coupled to the insert plate and extending from a surface of the insert plate; a plurality of feet, wherein each foot is coupled to a second, distal end of the leg.

The insert plate may be coupleable to a multiwell plate to provide the plurality of feet in a plurality of wells of the multiwell plate and thereby deliver ice nucleating material into each well.

In embodiments, the insert plate further comprises a plurality of holes arranged in an array, wherein each leg is coupled to the insert plate in proximity to a hole.

The at least one housing may comprise a plurality of housings, wherein each housing is provided within a foot, and each housing comprises the cavity and at least one permeable housing wall.

Preferably, each housing comprises a first permeable housing wall and a second permeable housing wall, wherein the cavity is provided between the first and second permeable housing walls.

In any of the above embodiments, the housing comprises at least one air vent hole, to allow air in the cavity to escape when water enters the cavity through a permeable housing wall, thereby reducing pressure within the cavity.

In embodiments, the insert plate may snap-fit onto a multiwell plate. In embodiments, a length of each leg of the insert plate is less than a depth of each well of a multiwell plate. In embodiments, a combined length of the leg and the foot is less than a depth of each well of a multiwell plate. In each case, this arrangement may enable the foot (and therefore the ice nucleating material) to be provided close to the base of the well (where cooling is applied, and ice formation is more likely). This arrangement may prevent the foot from contacting any biological matter (e.g. cells) that is present at or near the base of the well, which could otherwise cause damage to the biological matter.

The or each permeable housing wall or the embodiments described herein may be formed of any one of: a permeable material, a material comprising one or more holes, a sponge material, a material comprising a sponge material, a wicking material, a filter plate, a filtering material, a mesh material, a permeable membrane, a hydrophilic filter, and a hydrophilic membrane material.

In any of the embodiments described herein, the ice nucleating material may be any one of: a gram-negative bacterium, *Pseudomonas syringae*, crystalline cholesterol, encapsulated silver iodide, and a feldspar.

According to a second aspect of the invention, there is provided a use of an apparatus as described herein for nucleating ice in a container, wherein the container is any one of: a test tube, a vial, a straw, a well of a multiwell plate, a multiwell plate, and a bag.

According to a third aspect of the invention, there is provided a use of an apparatus as recited herein for nucleating ice in a multiwell plate.

According to a fourth aspect of the invention there is provided a method of nucleating ice, the method comprising: inserting the apparatus described herein into a container containing a biological sample to be frozen.

According to a fifth aspect of the invention there is provided a method of nucleating ice, the method comprising: inserting the apparatus described herein into a multiwell plate having a plurality of wells, each well containing a biological sample to be frozen. Preferably, the apparatus is compatible with the multiwell plate. Thus, preferably, the apparatus inserted into a multiwell plate comprises an N×M array of legs, and wherein the plurality of wells of the multiwell plate are arranged in an N×M array.

According to a sixth aspect of the invention there is provided a system for performing ice nucleation, comprising: a container for containing a sample to be frozen; and an apparatus as recited herein. The container may be any one of: a test tube, a vial, a straw, a well of a multiwell plate, a multiwell plate, and a bag.

BRIEF DESCRIPTION OF THE DRAWINGS

The techniques are diagrammatically illustrated, by way of example, in the accompanying drawings, in which:

FIG. 6a shows a system comprising an ice nucleating apparatus having a stem coupled to a lid of a container;

FIG. 6b shows a system comprising an ice nucleating apparatus having a stem coupled to a lid of a container (left), and a perspective view of the ice nucleating apparatus (right);

FIG. 8c is a schematic diagram showing steps to encapsulate ice nucleating material in the portion of the ice nucleating apparatus of FIG. 8a;

FIG. 9b shows a perspective view of the underside of the ice nucleating apparatus of FIG. 9a.

DETAILED DESCRIPTION

Figure 1A:
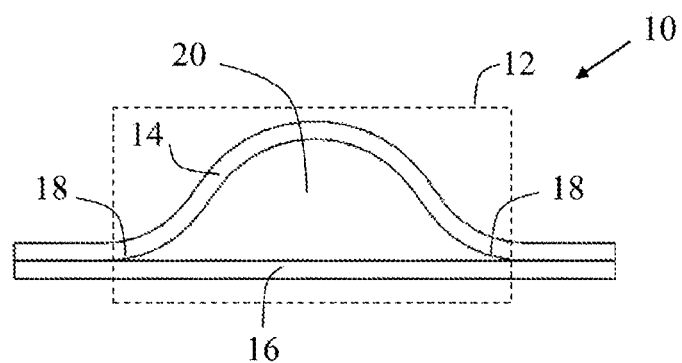
FIG. 1a shows a cross-sectional view from a side of an apparatus for performing ice nucleation according to an embodiment.

Broadly speaking, embodiments of the present technique provide apparatus for controlling ice formation, such as during the processes of cryopreservation and freeze drying. In particular, the apparatus provides a mechanism to deliver an ice nucleating material into a biological sample that is to be preserved, without allowing the ice nucleating agent to contact or contaminate the biological matter within the sample. Advantageously, embodiments of the apparatus may be manufactured for compatibility with existing, widely used laboratory equipment, such as vials, tubes, multi-well plates, etc. A further advantage of the apparatus is increased cell viability following freezing and subsequent thawing of samples.

The apparatus of the present application enables the freezing process in cryopreservation and freeze drying to be controlled (and in particular, for ice formation to be controlled), such that a sample freezes at a temperature closer to the melting point of the sample. Small volumes of liquid may freeze at temperatures below the melting point of the liquid. For example, the temperature at which ten litres of water freezes (at one atmosphere of pressure) is ~0° C., while smaller volumes of water, e.g. a few microliters of water, typically freeze at much lower temperatures, e.g. −30° C. (at one atmosphere of pressure). Furthermore, there can be a significant variation in the exact temperature at which small volumes of water freeze. When a frozen sample contains biological matter (such as cells), the viability of the biological matter depends on the freezing and thawing process. Typically, biological samples are frozen in small volumes, and thus, will freeze at temperatures lower than the melting point of the sample/liquid in which the biological material is contained. However, if a biological sample freezes at a temperature much lower than the melting point of the sample, then it is more likely to become damaged or de-natured during the freezing and thawing process. Thus, to reduce the risk of damaging a biological sample during freezing, techniques are used to raise the temperature at which the sample freezes, such as by adding an ice nucleating material to the sample.

The ice nucleating apparatus advantageously delivers an ice nucleating material to a sample to be frozen while preventing the ice nucleating material from permeating through the sample and contacting any biological matter within the sample. As described below in more detail, the ice nucleating apparatus may take different forms—it may be an apparatus that can be added to a container containing a sample, it may be in the form of a multiwell plate, and/or it may be in the form of an insert plate for a multiwell plate. In each embodiment, the ice nucleating apparatus comprises a housing having a cavity and at least one permeable housing wall, and an ice nucleating material encapsulated in the cavity. The permeable housing wall is permeable to liquid molecules (e.g. water), but may not permeable to any biological matter (e.g. cells, proteins, vaccines, etc.), and may not be permeable to the ice nucleating material. Accordingly, when a sample to be frozen is brought into contact with the apparatus, liquid in the sample is able to permeate through the permeable housing wall such that the formation of liquid ice crystals is induced by the apparatus while the sample is cooled. Once the temperature of the sample has reached a sufficiently low temperature, the ice nucleating material seeds the formation of ice crystals. The ice crystal then propagates through the liquid sample. The ice nucleating apparatus remains within the frozen sample and may be removed after the frozen sample has been thawed. In embodiments, the ice nucleating apparatus may be reusable. Alternatively, the ice nucleating apparatus is a single-use apparatus, i.e. is disposable.

In embodiments, a pore size of the permeable housing wall may be larger than the size of a particle of ice nucleating material, but when the ice nucleating material is in powder form the particles tend to bind together and do not flow. When the ice nucleating material is wetted, it is often even more reluctant to flow. Thus, there is a reduced chance that the ice nucleating material will escape from the cavity through the pores. In embodiments, a pore size of the permeable housing wall may be larger than the size of the biological matter (e.g. cells) within the container. However, the biological matter is typically deposited on, or located at, a base of the container, and may often be substantially fixed to the base, such that it is unlikely the biological matter will directly contact the apparatus and permeate through the permeable housing wall.

The term "apparatus" is used interchangeably herein with the term "ice nucleating apparatus", "device", and "device which contains a material".

The term "ice nucleating material" is used interchangeably herein with the terms "ice nucleant", "nucleating agent", and "freezing agent".

The term "sample" is used interchangeably herein with the terms "biological sample", "biological matter", "biological material", "biological media", "liquid", and "fluid".

The "sample" may be contained within a container, as described in more detail below. The term "container" is used interchangeably herein with the terms "vessel", "sample vessel", "test tube", "vial", "straw", "multiwell plate", "well", "bag".

The term "permeable housing wall" is used interchangeably herein with the terms "dividing barrier", "barrier" "permeable membrane", "membrane", "membrane material", and "membrane layer". However, it will be understood that the permeable housing wall may be formed of any suitable permeable material or substance and that "membrane" is merely an example material. The or each permeable housing wall may be formed from any one of the following: a permeable material, a material comprising one or more holes, a sponge material, a material comprising a sponge material, a wicking material, a filter plate, a filtering material, a mesh material, a permeable membrane, a hydrophilic filter, and a hydrophilic membrane material.

FIG. 1a shows a cross-sectional view from a side of an apparatus 10 for performing ice nucleation according to an embodiment. In this embodiment, the apparatus 10 comprises a housing portion/housing 12 (illustrated by the dashed lines). The housing 12 comprises a wall 14 and a wall 16, and comprises a cavity 20. The cavity 20 is disposed between (or formed between) wall 14 and wall 16. Walls 14 and 16 may extend beyond housing 12, as shown. The apparatus 10 comprises ice nucleating material (not shown), which is encapsulated in the cavity 20. The housing 12 comprises at least one edge portion 18. Walls 14 and 16 are bonded together at edge portion 18 to form the cavity 20 and to encapsulate the ice nucleating material within the cavity.

Figures 4A, 4B:
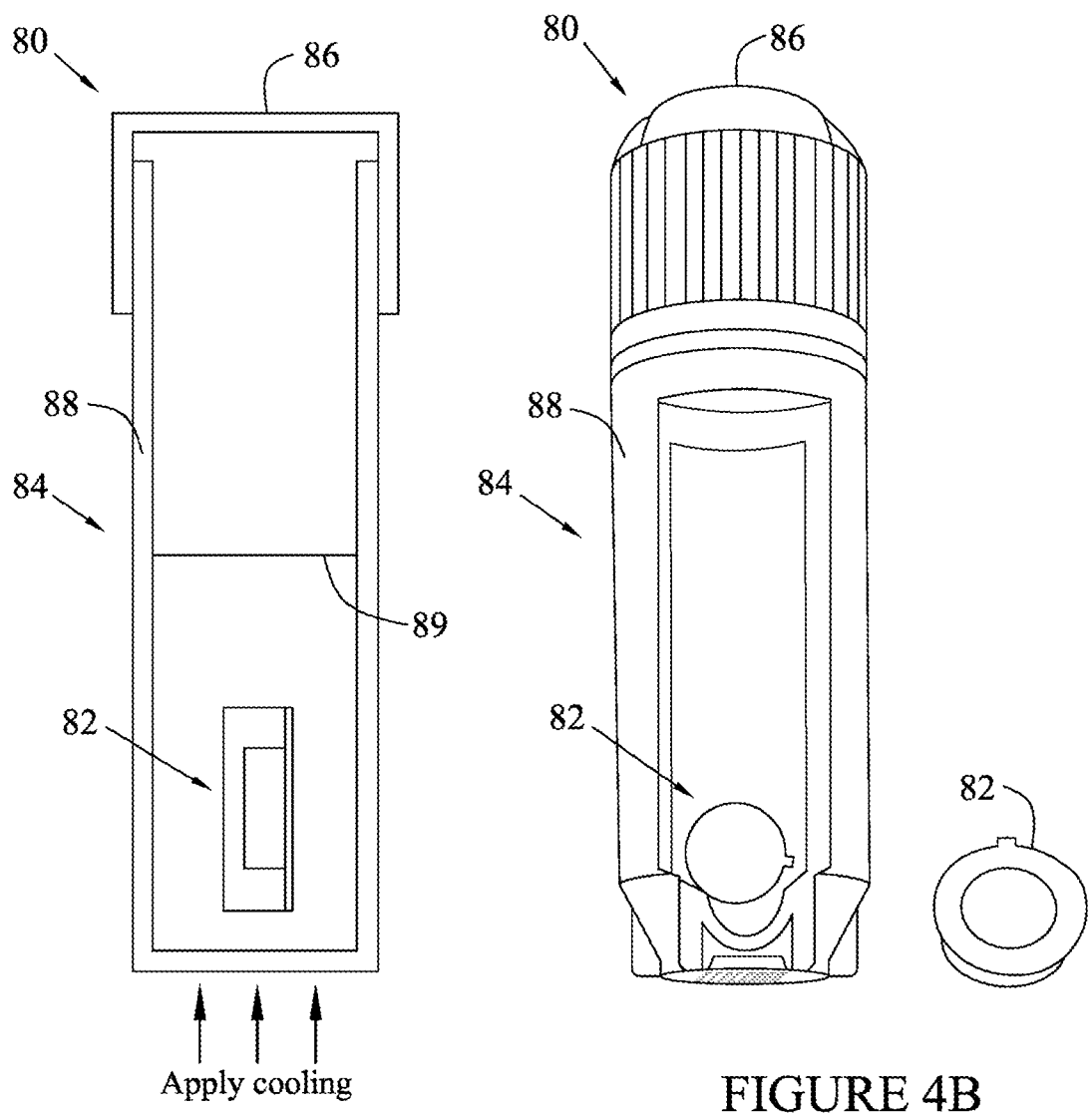
FIG. 4a shows a system comprising an ice nucleating apparatus.
FIG. 4b shows a system comprising an ice nucleating apparatus (left) and a perspective view of the ice nucleating apparatus (right)

Apparatus 10 is a device which may be added to a container containing a sample to be frozen (as shown in FIGS. 4a and 4b). Accordingly, at least one of wall 14 and wall 16 is a permeable housing wall, which enables liquid in the sample to contact the ice nucleating material encapsulated in the cavity 20. In embodiments, both wall 14 and wall 16 are permeable housing walls, and may be formed of the same or different material. As illustrated in FIG. 1a, the walls 14 and 16 may be formed of separate layers, i.e. wall 14 is formed of a first layer and wall 16 is formed of a second layer. The first layer and second layer may be bonded together at least at edge portion 18 of the housing 12 to encapsulate the ice nucleating material within the cavity. In an alternative embodiment (not shown), the housing 12 may be formed of a permeable layer having a first portion and a second portion, wherein a first permeable housing wall 14 of the housing 12 is formed of the first portion of the permeable material layer, and a second permeable housing wall 16 is formed of the second portion of the permeable material layer. That is, a single permeable layer of material may be folded to provide walls 14 and walls 16 of the housing 12. In such an arrangement, the cavity 20 is provided between the first portion and the second portion of the permeable material layer. The first portion and the second portion of the permeable material layer are bonded together at least at edge portion 18 of the housing 12 to encapsulate the ice nucleating material within the cavity 20, where the edge portion 18 surrounds the cavity 20.

Any suitable technique to bond walls 14 and 16 (or the first portion and second portion of a single permeable layer), may be used to encapsulate the ice nucleating material within the cavity 20. For example, the walls 14 and 16 may be heat sealed together at edge portion 18, or they may be bonded using an adhesive or mechanical bonding techniques.

Figure 1B:
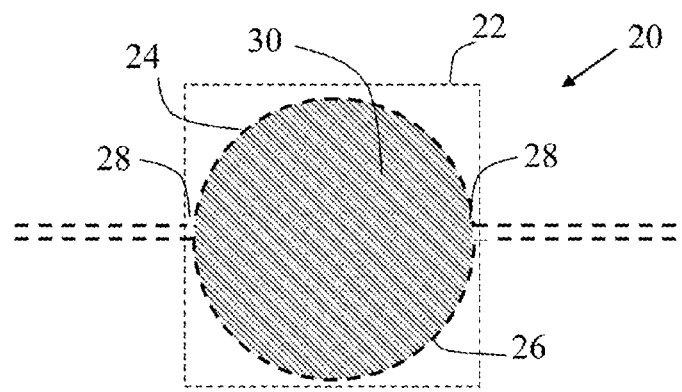
FIG. 1b shows a cross-sectional view from a side of an apparatus for performing ice nucleation according to a further embodiment.

In the embodiment shown in FIG. 1a, the cavity is formed by shaping one of the walls of the housing 12, i.e. wall 14. In this case, the cavity 20 has a substantially hemispherical form, but any other shape may be employed. In alternative embodiments, the cavity 20 may be formed by shaping both of the housing walls 14 and 16, as shown in FIG. 1b. FIG. 1b shows a cross-sectional view from a side of an apparatus for performing ice nucleation according to a further embodiment. Here, apparatus 20 comprises a housing portion/housing 22 (illustrated by the dashed lines). The housing 22 comprises a wall 24 and a wall 26, and comprises a cavity 30 disposed between (or formed between) wall 24 and wall 26. The apparatus 20 comprises ice nucleating material (not shown), which is encapsulated in the cavity 30. The housing 22 comprises at least one edge portion 28. Walls 24 and 26 are bonded together at edge portion 28 to form the cavity 30 and to encapsulate the ice nucleating material within the cavity. In this embodiment, both walls 24 and 26 are shaped to form the cavity 30. As illustrated, the cavity 30 may have a substantially spherical form, but any other shape may be employed, and each wall 24 and 26 may have a different shape/form.

The techniques and materials used to form apparatus 20 of FIG. 1b are similar to those described above with respect to apparatus 10 of FIG. 1a. In particular, at least one of housing walls 14 and 16, and housing walls 24 and 26, is permeable to liquid (e.g. water). In embodiments, both housing walls 14 and 16, and both housing walls 24 and 26, are permeable to water/liquid. The permeable housing walls may be composed of a material that has one or more pores/holes which are permeable to water and air, but which may not be permeable to biological materials present within a sample, and which may not permeable to ice nucleating material encapsulated within the ice nucleating apparatus, as described above. Any of the housing walls may be made from a range of materials including a permeable material, a material comprising one or more holes, a sponge material, a material comprising a sponge material, a wicking material, a filter plate, a permeable membrane, a hydrophilic filter, and a hydrophilic membrane material.

A typical pore size (e.g. diameter) of the one or more pores of the permeable housing wall may be in the range of 0.1 µm-10 µm, though the pore may be any suitable diameter to enable liquid in the sample to be frozen to permeate through the permeable housing wall, but to prevent (or reduce the likelihood of) the ice nucleating material permeating out of the cavity. In embodiments, the or each permeable housing walls may be composed of standard laboratory filter paper, which is available with a wide range of pore sizes.

The cavity of the ice nucleating apparatus (e.g. cavity 20 and cavity 30) may have a cavity volume of around 1 mm$^3$. Preferably, the cavity has a volume suitable for encapsulating a sufficient quantity of ice nucleating material within the cavity to facilitate ice nucleation within a sample, or to optimise the ice formation process in a sample. In embodiments, the cavity volume is in the range of 0.1 mm$^3$-100 mm$^3$.

The ice nucleating material may be composed of a range of materials such as a gram-negative bacterium, bacterium *Pseudonomas syringae*, crystalline cholesterol, encapsulated silver iodide and feldspar, in any physical form, including particulate form. An advantage of particulate form over bulk form is that particulate form comprises a relatively high surface area as compared to the bulk form, which therefore increases the ice nucleating activity of the ice nucleating material. Preferably, the ice nucleating material used to freeze a sample is one that does not contaminate the sample. For example, the ice nucleating material should not be toxic, excessively acidic or alkaline, or biologically active, if it is to be used to initiate freezing of a biological sample.

Figure 2:
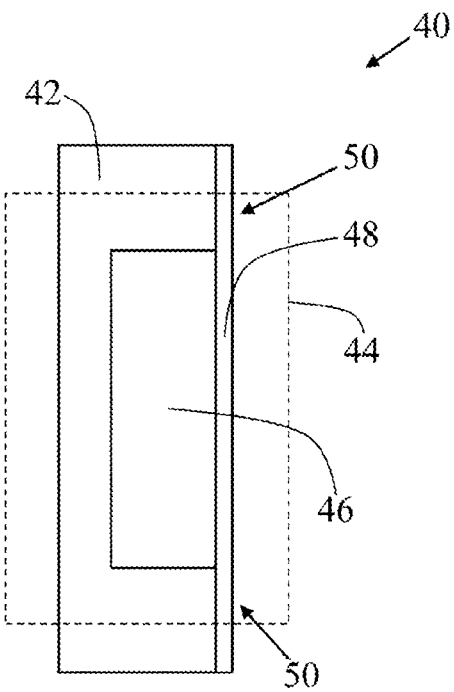
FIG. 2 shows a cross-sectional view from a side of an apparatus for performing ice nucleation according to a further embodiment.

Turning now to FIG. 2, this shows a cross-sectional view from a side of an apparatus 40 for performing ice nucleation according to a further embodiment. In this embodiment, the apparatus 40 comprises a housing 44. The housing 44 (indicated by the dashed line) comprises all or part of a housing body 42, all or part of a permeable housing wall 48, and a cavity 46. The cavity 46 is provided between the housing body 42 and the permeable housing wall 48. Apparatus 40 is a device which may be added to a container containing a sample to be frozen (as shown in FIGS. 4a and 4b). Accordingly, permeable housing wall 48 enables liquid in the sample to contact the ice nucleating material (not shown) encapsulated in the cavity 46. In embodiments, the housing body 42 may be formed of an impermeable material, but may be formed of a permeable material in particular embodiments. The housing body 42 and permeable housing wall 48 may be formed of the same material, where the material is adapted to make it permeable to form the permeable housing wall 48 (e.g. by forming pores/holes in the material, or otherwise).

The housing body 42 may be composed of any suitable material e.g. a polymer that is able to withstand low temperatures. The housing body 42 may, in embodiments, be formed of polypropylene because it is well suited to low temperature applications and is compatible with heat sealing processes typically used to fabricate apparatus 40 (e.g. to bond permeable housing wall 48 to housing body 42). The permeable housing wall 48 may be formed from any permeable material, such as those mentioned above.

The housing wall 48 is bonded onto the housing body 42 at least at edge portion 50 of housing 44, by any suitable bonding technique, such as heat sealing, using an adhesive or using a mechanical fixing at edge portion 50 of the housing 44. The cavity 46 may be filled with any suitable ice nucleating material, such as those described above.

Figure 3:
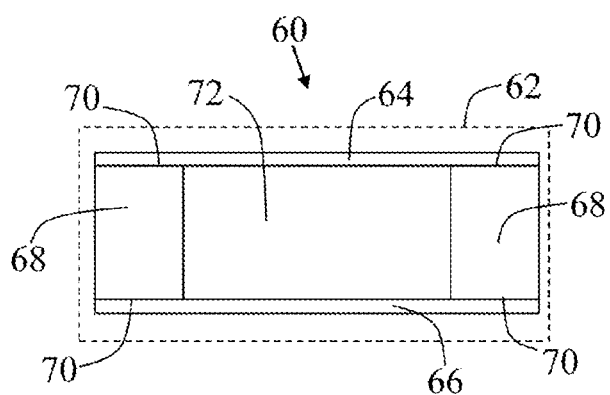
FIG. 3 shows a cross-sectional view from a side of an apparatus for performing ice nucleation according to a further embodiment.

FIG. 3 shows a cross-sectional view from a side of an apparatus 60 for performing ice nucleation according to a further embodiment. In this embodiment, the apparatus 60 comprises a housing 62. The housing 62 comprises a housing body 68, a first permeable housing wall 64 and a second permeable housing wall 66. The housing body 68 may be a disc comprising a through hole, the through hole forming a cavity 72. The first permeable housing wall 64 is provided over the through hole and bonded to a first surface of the housing body 68, and the second permeable housing wall 66 is provided over the through hole and bonded to a second surface of the housing body 68, to encapsulate ice nucleating material within the cavity 72.

In this embodiment, the housing walls 64 and 66 may be formed of separate layers of material (as shown), or may be formed from a single layer of material which is wrapped around housing body 68 (variation not shown). Both housing walls 64 and 66 are preferably permeable to water, but in embodiments, one of the housing walls 64 and 66 may be impermeable. The housing walls 64 and 66 may be formed of a material that has pores which are permeable to water and air, but which may not be permeable to biological materials present within a sample and may not be permeable to the ice nucleating material, as described above. (That is, powder particles of ice nucleating material tend to bind together into a cluster or clump that is less likely to be able to pass through the pores and is less likely to flow. Biological matter is typically deposited on, or substantially fixed to, a base of a sample container, such that it is unlikely the biological matter will directly contact the apparatus and permeate through the permeable housing wall.) The housing walls 64 and 66 may be bonded to, respectively, a first surface and a second surface of housing body 68, by either a heat sealing technique, an adhesive or by mechanical fixing at least at edge portion 70 of the housing 62. The edge portion 70 surrounds cavity 72. Ice nucleating material is provided within the cavity 72. The cavity 72 may have a volume suitable for encapsulating a sufficient quantity of ice nucleating material within the cavity to facilitate ice nucleation within a sample, or to optimise the ice formation process in a sample. In embodiments, the cavity volume is in the range of $0.1 \text{ mm}^3\text{-}100 \text{ mm}^3$.

FIG. 4a shows a system 80 comprising an ice nucleating apparatus 82 and a container 84. Container 84 may be a commonly used container for storing frozen samples, such as a cryopreservation vessel. The container 84 is generally any suitable vessel for holding and storing samples which are to be frozen and later thawed, such as, but not limited to: vials, straws, multiwell plates, and bags. The ice nucleating apparatus 82 may be, for example, any of the ice nucleating apparatus described above with reference to FIGS. 1a, 1b, 2 and 3. In the depicted embodiment, the ice nucleating apparatus resembles apparatus 40 of FIG. 2, but this is merely an illustrative example of the system. The container 84 comprises a lid 86 and a main body 88 (also referred to as a "body", or "body portion"). The lid 86 may be a cap, a stopper, a screw-top lid or any other lid that is suitable for closing/sealing the container 84.

To freeze a sample, a sample is first placed into container 84. The sample may be a liquid containing biological matter, such as cells or proteins. (In FIG. 4a, a fill line 89 is shown, merely to illustrate the presence of the sample.) The ice nucleating apparatus 82 is placed into the main body 88 of the container, such that it is within the sample (i.e. below fill line 89). The container 84 is cooled by a cooling mechanism or apparatus (not shown), and typically, cooling is applied from below container 84 as shown. Liquid in the sample is able to contact the ice nucleating material contained within apparatus 82, by passing through the or each permeable housing wall, as explained above. The liquid which contacts the ice nucleating material forms an ice crystal which propagates and grows in the sample as the cooling is applied, thereby freezing the sample. The apparatus 82 freezes in the sample, and remains in the sample (and in container 84). The apparatus 82 may be removed from the sample (and container 84) when the sample is thawed.

FIG. 4b shows an image of the system 80 of FIG. 4a (left) and an image of the ice nucleating apparatus (right) (not to the same scale). In this example, the container 84 may comprise a screw-top lid 86. As shown, the ice nucleating apparatus 82 is preferably inserted into the bottom of the main body 88 of the container 84, such that it is closest to the cooling mechanism which applies cooling to system 80, to increase the speed of ice nucleation and freezing.

Figure 5A:
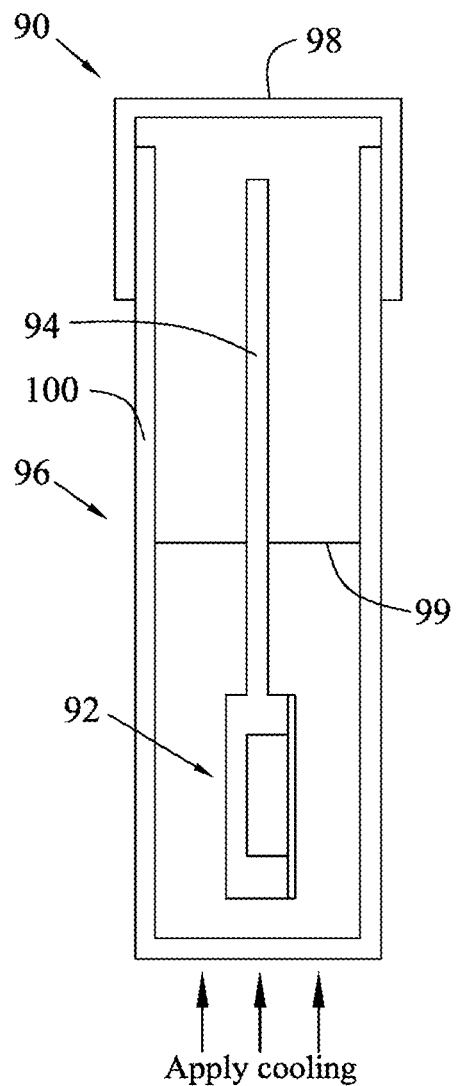
FIG. 5a shows a system comprising an ice nucleating apparatus having a stem.

FIG. 5a shows a system 90 comprising a container 96 and an ice nucleating apparatus 92. The ice nucleating apparatus 92 comprises a stem 94 (also referred to as an "arm" or "The Wand"). The container 96 comprises a lid 98 and a main body 100, and is similar to the container shown in FIG. 4a and described above. The ice nucleating apparatus 92 may be, for example, any of the ice nucleating apparatus described above with reference to FIGS. 1a, 1b, 2 and 3. In the depicted embodiment, the ice nucleating apparatus 92 resembles apparatus 40 of FIG. 2 with the addition of stem 94, but this is merely an illustrative example of the system.

As described above, to freeze a sample, a sample is first placed into container 96. The sample may be a liquid containing biological matter, such as cells or proteins. In FIG. 5a, a fill line 99 is shown, merely to illustrate the presence of the sample. The ice nucleating apparatus 92 is placed into the main body 100 of the container 96, such that it is within the sample (i.e. below fill line 99). The container 84 is cooled by a cooling mechanism or apparatus, as described above with reference to FIG. 4a. The apparatus 92 freezes in the sample, and remains in the sample (and in container 96). The apparatus 92 may be removed from the sample (and container 96) when the sample is thawed. An advantage of the embodiment of the ice nucleating apparatus 92 shown in FIG. 5a is that the stem 94 of the apparatus 92 allows control over the position of the apparatus 92 within the container 96. In this embodiment the apparatus can be easily and manually removed on thawing by pulling the stem 94.

Figure 5B:
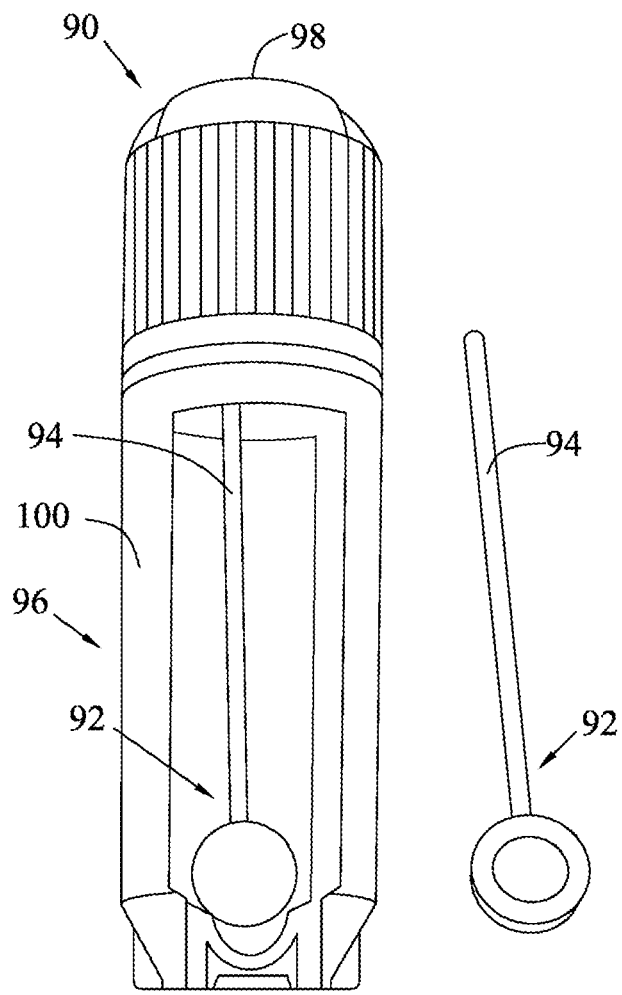
FIG. 5b shows a system comprising an ice nucleating apparatus having a stem (left), and a perspective view of the ice nucleating apparatus (right)

FIG. 5b shows an image of the system 90 of FIG. 5a (left) and an image of the ice nucleating apparatus 92 (right) (not to the same scale). In this example, the container 96 may comprise a screw-top lid 98. As shown, the ice nucleating apparatus 92 is preferably inserted into the bottom of the main body 100 of the container 96, such that it is closest to the cooling mechanism which applies cooling to system 90, to increase the speed of ice nucleation and freezing.

FIG. 6a shows a system 110 comprising a container 116, and an ice nucleating apparatus 112 having a stem 114 that is coupled to a lid 118 of the container 116. The ice nucleating apparatus 112 comprises a stem 114 (also referred to as an "arm" or "The Wand"). The container 116 comprises a lid 118 and a main body 111, and is similar to the container shown in FIGS. 4a and 5a described above. The ice nucleating apparatus 112 may be, for example, any of the ice nucleating apparatus described above with reference to FIGS. 1a, 1b, 2 and 3. In the depicted embodiment, the ice nucleating apparatus 112 resembles apparatus 40 of FIG. 2 with the addition of stem 114 that is coupled to lid 118, but this is merely an illustrative example of the system. The stem 114 is attached to an inner surface of the lid 118 (also referred to as a "cap") of the container 116 (also referred to as a "cryovial" or "cryopreservation vessel").

An advantage of the embodiment of the ice nucleating apparatus shown in FIG. 6a is that the stem 114 that is attached to the lid 118 enables control of the position of the ice nucleating apparatus 112 with respect to the container 116 in a repeatable and accurate manner. A result of this improved control is consistent, and greater, sample viability following the freezing and thawing process. A further advantage of this embodiment is that the apparatus 112 is held at the same position in the cryovial 116 which is expected to be at the lowest temperature during cooling. This both optimises ice nucleation within a vial and ensures the same thermal history in all vials. Upon thawing the device 112 is removed from the sample when the cap 118 is unscrewed.

FIG. 6b shows an image of the system 110 of FIG. 6a (left) and an image of the ice nucleating apparatus 112 (right) (not to the same scale). In this example, the container 116 may comprise a screw-top lid 118. As shown, the ice nucleating apparatus 112 is preferably inserted into the bottom of the main body 111 of the container 116, such that it is closest to the cooling mechanism which applies cooling to system 100, to increase the speed of ice nucleation and freezing.

Figure 7A:
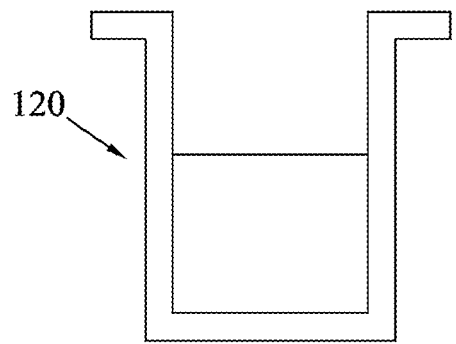
FIG. 7a shows a cross-sectional view of a well of a typical multiwell plate.
Figure 7B:
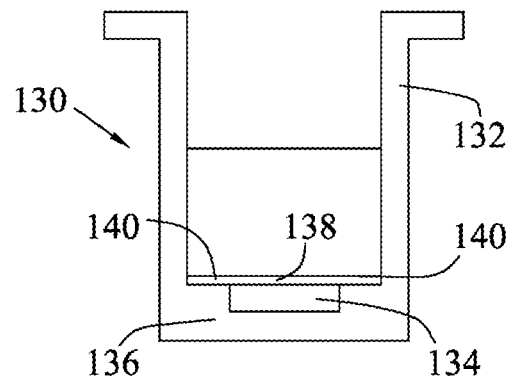
FIG. 7b shows a cross-sectional view of a portion of an ice nucleating apparatus, in embodiments where the apparatus takes the form of a multiwell plate.

FIG. 7a shows, for reference, a cross-sectional view of a well of a typical multiwell plate. FIG. 7b shows a cross-sectional view of a portion 130 of an ice nucleating apparatus, in embodiments where the apparatus takes the form of a multiwell plate. A multiwell plate (not shown) comprises an array of wells, and commonly available multiwell plates have 6, 12, 24, 48, 96, 384 and 1536 wells. In embodiments where the apparatus is in the form of a multiwell plate, the apparatus comprises a plurality of wells and a plurality of integrated housings, wherein an integrated housing is integrated in a well. FIG. 7b shows a portion 130 of (i.e. a well) of such an ice nucleating apparatus. In FIG. 7b, the well 130 comprises a body 132, and the body 132 comprises a cavity 134 for encapsulating ice nucleating material. The body 132 comprise a base wall 136 at a base of the well 130. A recess positioned within a portion of base wall 136 of the well 132 forms cavity 134. The recess is in an inner surface of the base wall 136. A permeable housing wall 138 is positioned over the cavity 134 and is bonded at an edge portion 140 of base wall, where the edge portion 140 surrounds the cavity 134. An advantage of having the cavity 134 and ice nucleating material in the base wall 136 is that it is in close proximity to the coolest part of the sample within the well 132 and the cooling mechanism (which is often below the well 132).

The process to bond the permeable housing wall 138 to the edge portion of base wall 140 is similar to the bonding processes mentioned above, e.g. heat sealing, adhesives and/or mechanical bonding.

In embodiments, the freezing agent is added to multiple chambers (e.g. wells) moulded into a single part (e.g. a multiwell plate) which is then sealed in place with a porous membrane. Each chamber is positioned close the bottom of a single well on a multiwell plate and allows high throughput cryopreservation with consistently low supercooling of adherent cells.

Figure 7C:
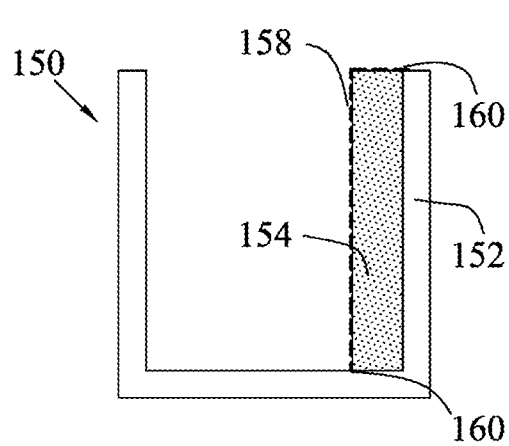
FIGS. 7c and 7d show cross-sectional views of a portion of an ice nucleating apparatus, in further embodiments where the apparatus takes the form of a multiwell plate.
Figure 7D:
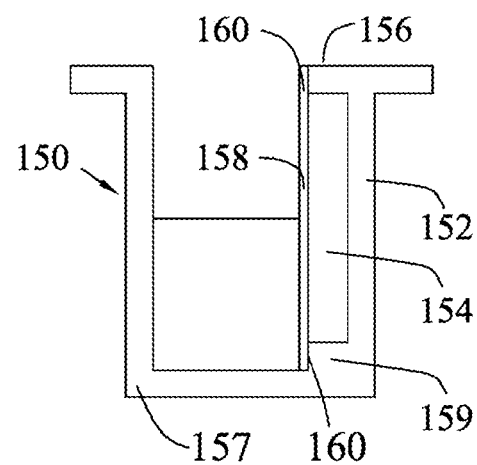

FIGS. 7c and 7d show cross-sectional views of a portion 150 of an ice nucleating apparatus in further embodiments where the apparatus takes the form of a multiwell plate. The portion 150 comprises a well 152 and a cavity 154 for encapsulating an ice nucleating material. In FIG. 7c, cavity 154 is formed along (all or part of) an inner side wall of well 152. Cavity 154 is formed between (all or part of) the inner side wall of well 152 and a permeable housing wall 158. The permeable housing wall may be bonded to the inner side wall of well 152 at bonding points 160.

In FIG. 7d, the portion 150 comprises a well 152 and a cavity 154 for encapsulating ice nucleating material. The cavity 154 may be formed in at least two ways. For example, a recess in a side wall 152 of the well 152 may form the cavity 154. The recess 154 is in an inner surface of the side wall 152. A permeable housing wall 158 is positioned over the cavity 154 and is bonded at least at an edge portion 160 of the side wall 152, the edge portion 160 surrounding the cavity 154. In another example, the cavity 154 may be formed between a lip 156 and a portion of base wall 157. In this example, the portion 150 comprises a lip 156 which partially extends into well 152 as shown. The well 152 comprises at least one side wall 152 and a base wall 157. The base wall 157 has a step portion 159. The cavity 154 is formed between the step portion 159 and lip 156. The permeable housing wall 158 is provided over the cavity 154 and bonded to a surface of the step portion 159 and lip 156, at positions 160.

The embodiment of FIG. 7d may be preferable over the embodiment of FIG. 7c, because the structure of the well 152 in the embodiment of FIG. 7d enables the permeable housing wall 158 to be bonded more efficiently and/or more securely, and to a greater surface area, than in the embodiment of FIG. 7c.

Figure 8A:
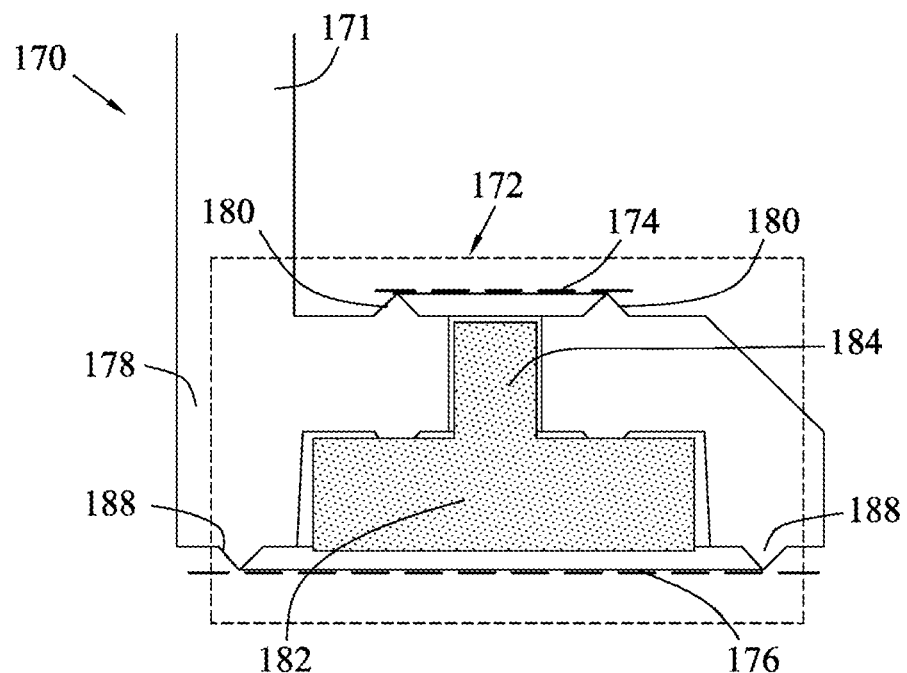
FIG. 8a shows a cross-sectional view from a side of a portion of an ice nucleating apparatus in embodiments where the apparatus takes the form of an insert plate for a multiwell plate.
Figure 9A:
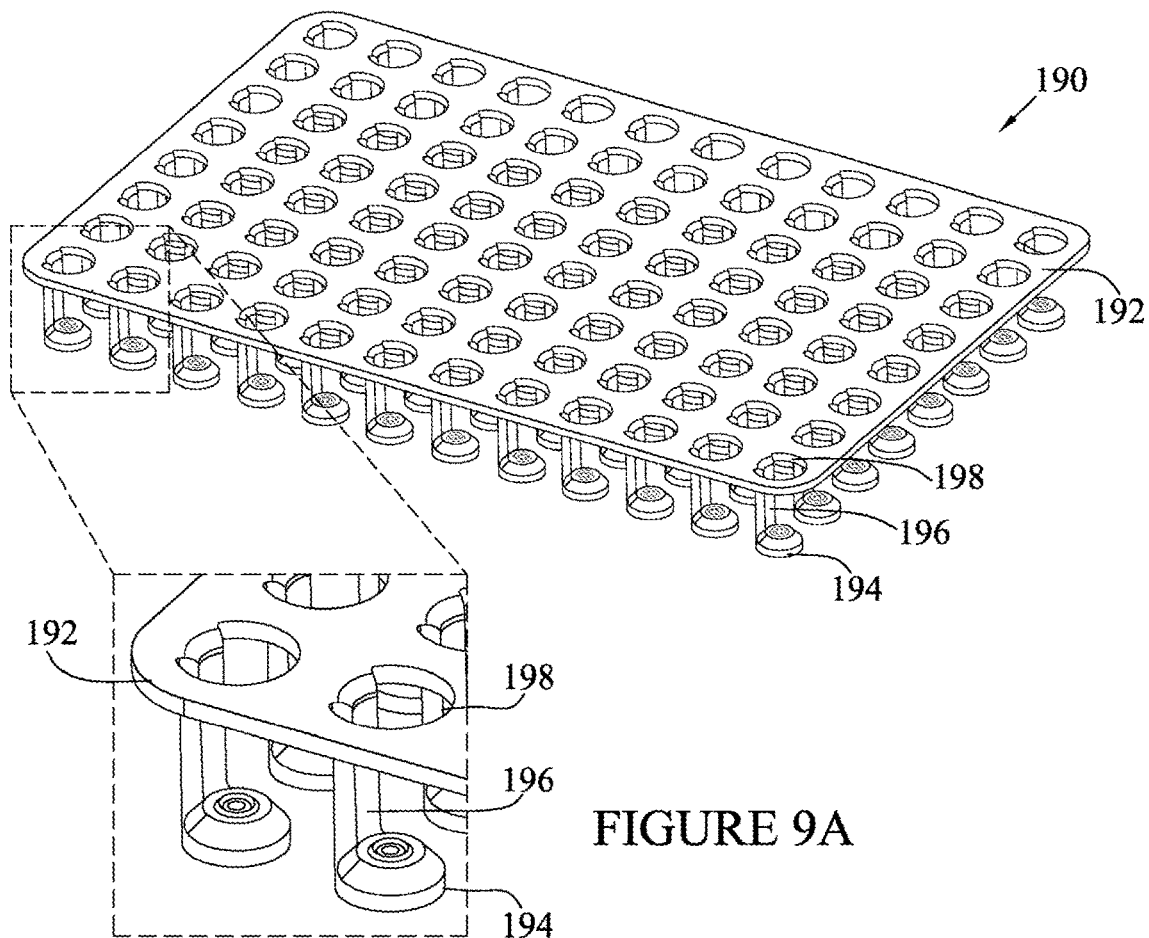
FIG. 9a shows a perspective view of an ice nucleating apparatus which takes the form of an insert plate for a multiwell plate, and a zoomed-in view of a portion of the ice nucleating apparatus.
Figure 9B:
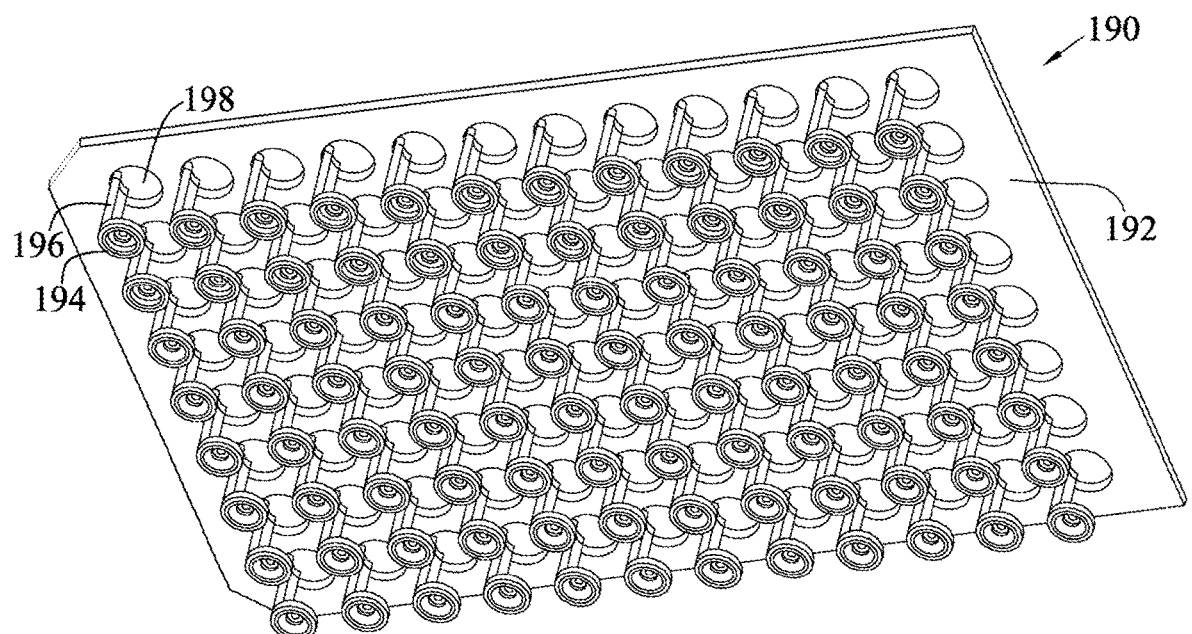

FIG. 8a shows a cross-sectional view from a side of a portion 170 of an ice nucleating apparatus in embodiments where the apparatus comprises an insert plate for a multiwell plate. FIG. 9a shows a perspective view of an ice nucleating apparatus 190 which comprises an insert plate 192 for a multiwell plate (not shown), and a zoomed-in view of a section of the ice nucleating apparatus 190. FIG. 9b shows a perspective view of an underside of the ice nucleating apparatus of FIG. 9a.

The ice nucleating apparatus 190 shown in FIGS. 9a and 9b comprises an array of holes 198. The number of holes 198, and the arrangement of holes in the array may vary to suit/match the number and arrangement of wells in a multiwell plate, such that when the ice nucleating apparatus 190 is used with a multiwell plate, the holes 198 align with the wells of the multiwell plate. For example, a multiwell plate may comprise an N×M array of wells, and ice nucleating apparatus 190 may comprise an array of N×M holes, such that the apparatus 190 is compatible with the multiwell plate. The ice nucleating apparatus 190 may be manufactured for compatibility with any size and type of commonly available multiwell plate, e.g. multiwell plates which have 6, 12, 24, 48, 96, 384 and 1536 wells. Advantageously therefore, the ice nucleating apparatus 190 is compatible with commercially available multiwell plates, and does not require the multiwell plates to be adapted. In embodiments, the ice nucleating apparatus 190 may snap-fit onto a multiwell plate, to secure the apparatus 190 to the multiwell plate. Additionally or alternatively, the ice nucleating may sit on the multiwell plate, and/or be secured to the multiwell plate using any suitable technique.

The apparatus 190 comprises a plurality of feet and a plurality of legs. A leg 196 of the plurality of legs is coupled, at a first end (or proximal end), to the insert plate 192 in close proximity to a hole 198. Each leg 196 extends substantially perpendicularly from a surface of the insert plate 192, such that each leg 196 is positioned on the same side of the insert plate 192. Each leg 196 is coupled, at a second end (or distal end), to a foot 194 of the plurality of feet. The foot 194 comprises a housing which has a cavity and at least one permeable housing wall. Ice nucleating material is encapsulated within the cavity. The length of each leg 196 of the plurality of legs is substantially identical, such that each foot 194 is located at substantially the same depth in a well when the apparatus 190 is coupled to a multiwell plate. This enables the ice nucleating material to be provided at the same position within each well of a multiwell plate for consistency and improved control of ice formation. The length of the legs 196 may be less than the length (or depth) of the wells of a multiwell plate, such that each foot 194 is separated from a base of the well by an amount. The separation between each foot 194 and the base of the well may enable a sample to permeate a permeable housing wall and contact the ice nucleating material, as described in more detail below.

The holes 198 of the apparatus 190 enable sample to be added into a multiwell plate once the apparatus 190 has been coupled to the multiwell plate. In embodiments, the apparatus 190 may be coupled to the multiwell plate after the samples have been added to the wells of the multiwell plate.

Parts of the apparatus 190 (such as the insert plate 192, the legs 196 and feet 198) may be made from a single piece of material. In embodiments, parts of the apparatus 190 may be formed from a polymer, or any material suitable for containing biomaterials and for use in cryopreservation/freeze drying. Techniques such as injection moulding and 3D printing may be used to manufacture parts of the apparatus 190. Some parts of the apparatus 190 may be fabricated using the process described with respect to FIGS. 8c and 8d below.

Turning back to FIG. 8a, the ice nucleating apparatus shown in FIGS. 9a and 9b is described in more detail. FIG. 8a shows a portion 170 of an ice nucleating apparatus (e.g. the apparatus 190 shown in FIG. 9a), which comprises an insert plate, a plurality of legs, and a plurality of feet. The portion 170 has a leg 171 which is coupled at a first end to the insert plate (not shown), and is couple at a second end to a foot 178. The foot 178 comprises a housing 172. The housing 172 comprises a cavity 182, a first housing wall 174 and a second housing wall 176. The cavity 182 may extend through a section of the foot 178 such that a first cavity opening is provided on a top surface of the foot 178, and second cavity opening is provided on a bottom surface of the foot 178. The first and second cavity openings are covered by the first housing wall 174 and the second housing wall 176, respectively. One or both of the first housing wall 174 and the second housing wall 176 may be a permeable housing wall. Preferably, both the first and second housing walls 174, 176 are permeable housing walls. This increases the volume of liquid which is able to contact the ice nucleating material encapsulated in cavity 182, which may increase the speed or efficiency of ice crystal formation via ice nucleation.

The housing 172 comprises sealing lips 180 and 188 which protrude from surfaces of the foot 178, and are positioned in the proximity of (and, in embodiments, surround) the first cavity opening and the second cavity opening respectively. The sealing lips 180 and 188 are preferably formed of the same material as the material used to form foot 178. In preferred embodiments, foot 178 and sealing lips 180, 188 are formed of a polymer material which is suitable for use in a heat sealing process. As described in more detail below, the housing walls 174 and 176 are bonded to the foot 178 to encapsulate ice nucleating material in cavity 182, preferably via a heat sealing process. The sealing lips 180, 188 are sacrificial portions of the foot 178 which melt in the heat sealing process to bond the housing walls 174 and 176 to the foot 178/housing 172. Melting the sealing lips 180, 188 improves the bond between the walls 174, 176 and the housing 172/foot 178. The housing 172 comprises an air vent 184 that enables air within the ice nucleating material to escape from the housing 172 when liquid in a sample permeates through the housing wall 176 (and thereby preventing pressure build-up within cavity 182).

Each housing wall 174 and 176 is formed of a separate piece of material. In embodiments, each housing wall 174, 176 is formed of a separate piece of permeable material. The separate pieces of material may be of the same type or of different types of material. Each housing wall 174 and 176 is in contact with a sealing lip 180 or 188 which is used to bond each housing wall 174 and 176 to the foot 178.

Figure 8B:
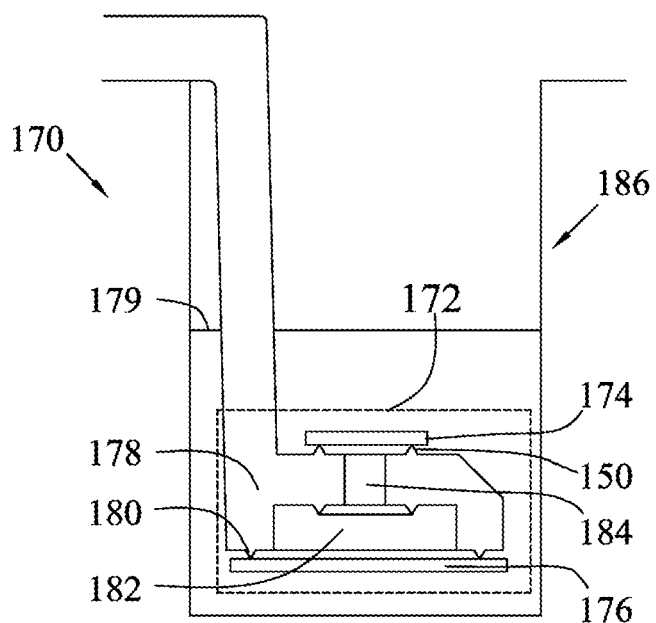
FIG. 8b shows a cross-sectional view of the portion of the ice nucleating apparatus of FIG. 8a inside a well of a multiwell plate.

FIG. 8b shows a cross-sectional view of the portion 170 of the ice nucleating apparatus of FIG. 8a inside a well 186 of a multiwell plate (not shown). To freeze a sample, the insert plate of the ice nucleating apparatus is coupled to a multiwell plate such that each foot of the apparatus is inserted into a well of the multiwell plate. A sample may be added to a well through a hole in the insert plate (see FIG. 9a). The sample may be a liquid containing biological matter, such as cells or proteins. FIG. 8b shows a fill line 179 merely to illustrate the presence of the sample. The volume of sample added to the well may need to be such that the sample is in contact with at least the lower permeable housing wall 176, but preferably also with the upper permeable housing wall 174.

To encapsulate ice nucleating material in the housing 172 of FIG. 8a, the following fabrication steps may be followed. Firstly, the first housing wall 174 is bonded to the housing 172 to seal the first opening of the cavity 182. As mentioned above, a heat sealing technique may be used to bond the first housing wall 174 to the housing 172, during which lip 180 is melted to secure the first housing wall 174 in position. The ice nucleating apparatus is then turned upside down, (i.e. such that the feet point upwards), to enable ice nucleating material to be added into cavity 182 through the second opening of the cavity. The second housing wall 176 is bonded to the housing 172/foot 178 to seal the second opening of the cavity 182. A heat sealing technique may be used to bond the second housing wall 176 to the housing 172, during which lip 188 is melted to secure the second housing wall 176 in position.

Figure 8C:
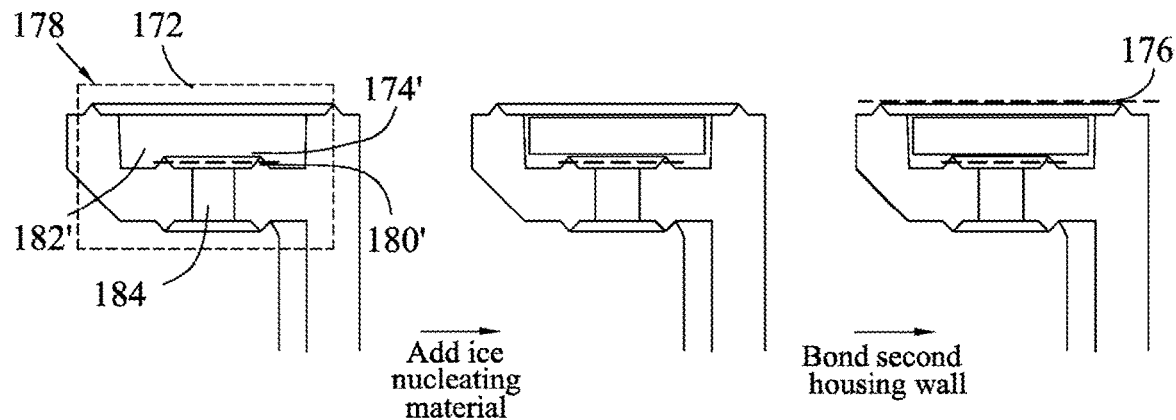

FIG. 8*c* is a schematic diagram showing steps to encapsulate ice nucleating material in the housing of the ice nucleating apparatus of FIG. 8*a*. The housing shown in FIG. 8*c* varies slightly to that shown in FIG. 8*a*. In particular, the first housing wall is located in a different place in the embodiment of FIG. 8*c* relative to the embodiment of FIG. 8*a*. In the embodiment of FIG. 8*c*, the first housing wall 180' is positioned within the foot 178, rather than on an external surface of the foot 178. Sealing lip 174' is positioned within the foot 178, rather than on an external surface of foot 178 (as per FIG. 8*a*). This is because cavity 182', which encapsulates ice nucleating material, does not extend through the foot 178—a first cavity opening opens on to air vent 184, rather than being provided on a top surface of the foot 178, while a second cavity opening is provided on a bottom surface of foot 178. An advantage of the arrangement of FIG. 8*c* is a simplified process to encapsulate ice nucleating material within the cavity 182', as the apparatus does not need to be turned (rotated) after bonding the first housing wall 180' to the housing 172 in order to fill the cavity 182' with ice nucleating material.

Thus, for the embodiment of FIG. 8*c*, to encapsulate ice nucleating material in the housing 172', the following fabrication steps may be followed. Firstly, the first housing wall 174' is bonded to the housing 172 to seal the first opening of the cavity 182'. As mentioned above, a heat sealing technique may be used to bond the first housing wall 174 to the housing 172, during which lip 180' is melted to secure the first housing wall 174' in position. Ice nucleating material may now be added into cavity 182' through the second opening of the cavity (without requiring the apparatus to be turned around). The second housing wall 176 is bonded to the housing 172/foot 178 to seal the second opening of the cavity 182. A heat sealing technique may be used to bond the second housing wall 176 to the housing 172, during which lip 188 is melted to secure the second housing wall 176 in position. An advantage of having the housing wall 174' inside the foot 178 as shown in FIG. 8*c* is that the apparatus does not need to be turned during the steps to encapsulate ice nucleating material, which may improve the ease and efficiency of manufacture (and reduces processing steps).

Figure 8D:
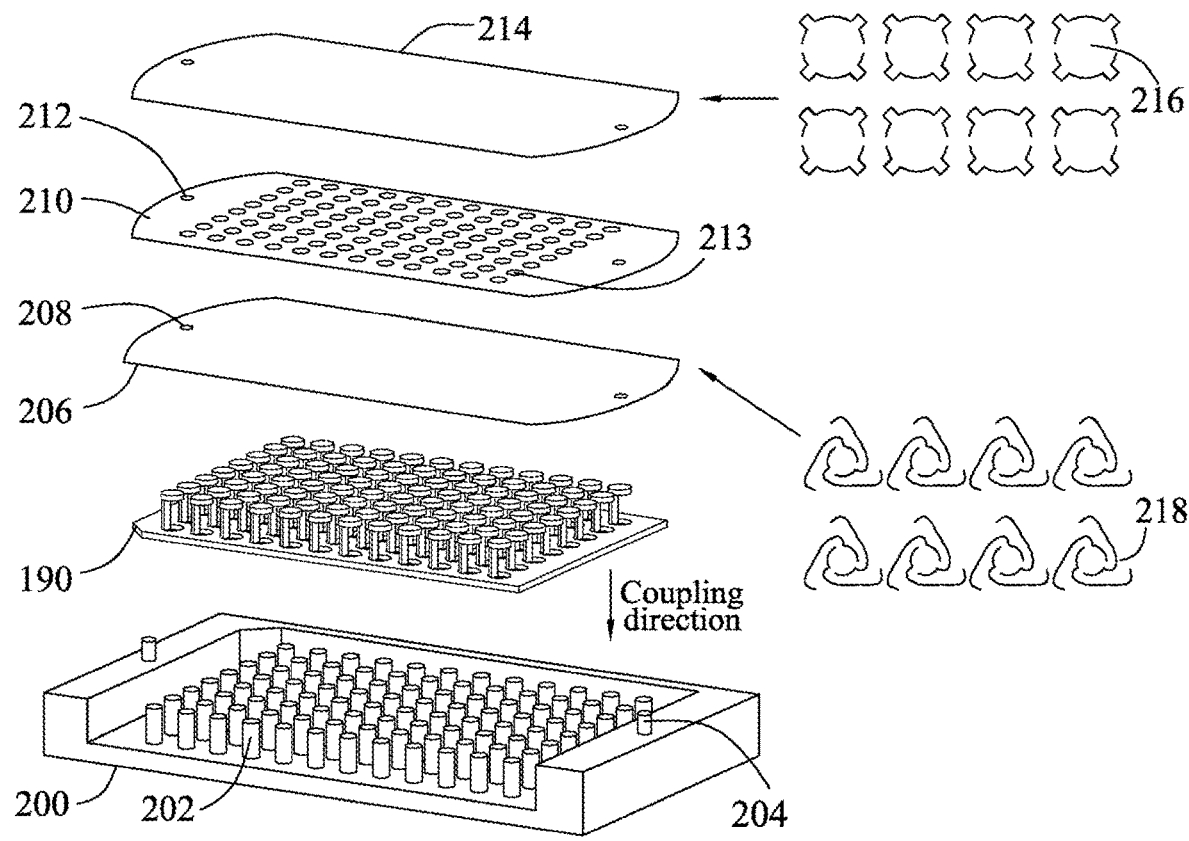
FIG. 8d is a schematic diagram showing steps to encapsulate ice nucleating material in an embodiment of the ice nucleating apparatus.

FIG. 8*d* is a schematic diagram showing example steps to encapsulate ice nucleating material in an embodiment of the ice nucleating apparatus. Firstly, the apparatus 190 is orientated so that the insert plate is placed on an alignment jig 200 with the plurality of feet of the apparatus facing upwards as shown in FIG. 8*d*. The apparatus 190 is then placed on alignment jig 200. The alignment jig 200 comprises an array of pegs 202 and one or more alignment pins 204. The apparatus is slotted onto the jig in the illustrated coupling direction, by aligning the insert plate with/to the alignment pin(s) 204, and aligning the holes of the insert plate of apparatus 190 with pegs 202 of the jig 200. The alignment pins 194 may be used to align the apparatus 190 to the jig 192, as well as to align other components used in the assembly of the apparatus 190. A first housing wall precursor 206 is then placed over the apparatus 190 and is aligned with the jig 200 using one or more holes 208 in the housing wall precursor 206, where the or each hole 208 mates with the or each pin 204 of the alignment jig 200 when aligned. The first housing wall precursor 206 comprises a sheet of housing wall material. The first housing wall precursor 206 comprises perforations 218. A heat sealing tool (not shown) is used to apply heat to the apparatus 190 to melt the sealing lips that are in contact with the first housing wall material, thereby bonding the housing wall material to the housing. Once the housing wall material has been heat sealed to each foot of the apparatus 190, excess, unused housing material is removed from the apparatus 190 by tearing the housing material off of the apparatus 190 (facilitated by the perforations 218).

A powder mask 210 is placed on top of the apparatus 190 and is aligned using one or more holes 212 that can mate with the or each pin 204 of the alignment jig 200. Ice nucleating material is then added to the cavity in each foot of the apparatus 190, by sprinkling the ice nucleating material through holes 213 of the powder mask 210. The powder mask 210 is removed from the apparatus 190. In embodiments, the density of the ice nucleating material may be approximately 2.6 g $cm^{-3}$ in bulk form, and may be approximately 1.0 g $cm^{-3}$ in powder form.

A second permeable housing wall precursor 214 is placed over the apparatus 190 and is sealed to the apparatus 190 using heat sealing as described above. The second permeable housing wall precursor 214 comprises perforations 216 which enable unused sections of the precursor 214 to be readily removed after the heat sealing process. Excess membrane material is removed once it has been sealed to the apparatus 190.

As mentioned earlier, the or each permeable housing wall preferably have some or all of the following functions and properties: to retain the ice nucleating material in the cavity, to allow air to escape out of the cavity (and prevent pressure build-up in the cavity), and to allow the fluid sample to pass through the housing wall and contact the ice nucleating material.

The permeable housing wall may have a suitable pore size close to the particle size of the ice nucleating material. Typically, a pore size (diameter) of 0.1 μm to 10 μm is suitable. The pore size may, in embodiments, be larger than the size of a particle of ice nucleating material, but when the ice nucleating material is in powder form the particles tend to bind together and do not flow. When the ice nucleating material is wetted, it is often even more reluctant to flow. Thus, there is a reduced chance that the ice nucleating material will escape from the cavity through the pores.

Preferably, the permeable housing wall is formed of a hydrophilic material which absorbs water and permits the fluid sample to permeate through the material, so that the fluid can engage with/contact the ice nucleating material. Standard laboratory filter paper is a suitable material to provide a permeable housing wall, and is available with a wide range of pore sizes. Standard laboratory filter paper is usually made from a fibrous cellulose material.

The fibres of the permeable housing wall may bind with the housing during the heat sealing process, particularly if the housing is formed of a polymer material.

The first housing wall precursor and the second housing wall precursor (used to encapsulate ice nucleating material in the feet of the insert plate), are preferably sheets of material comprising multiple housing wall segments that are positioned in the correct location and have the correct size to enable the segments to be stamped, laser cut, or otherwise removed from the sheets and applied to the feet. Advantageously, this enables the first housing wall of the plurality of feet to be bonded to each foot in a single manufacturing step (and similar for the second housing wall of each foot). The housing wall segments may be surrounded by perforations in particular patterns, which help to align the housing wall segments to each foot prior to heat sealing.

Figure 10:
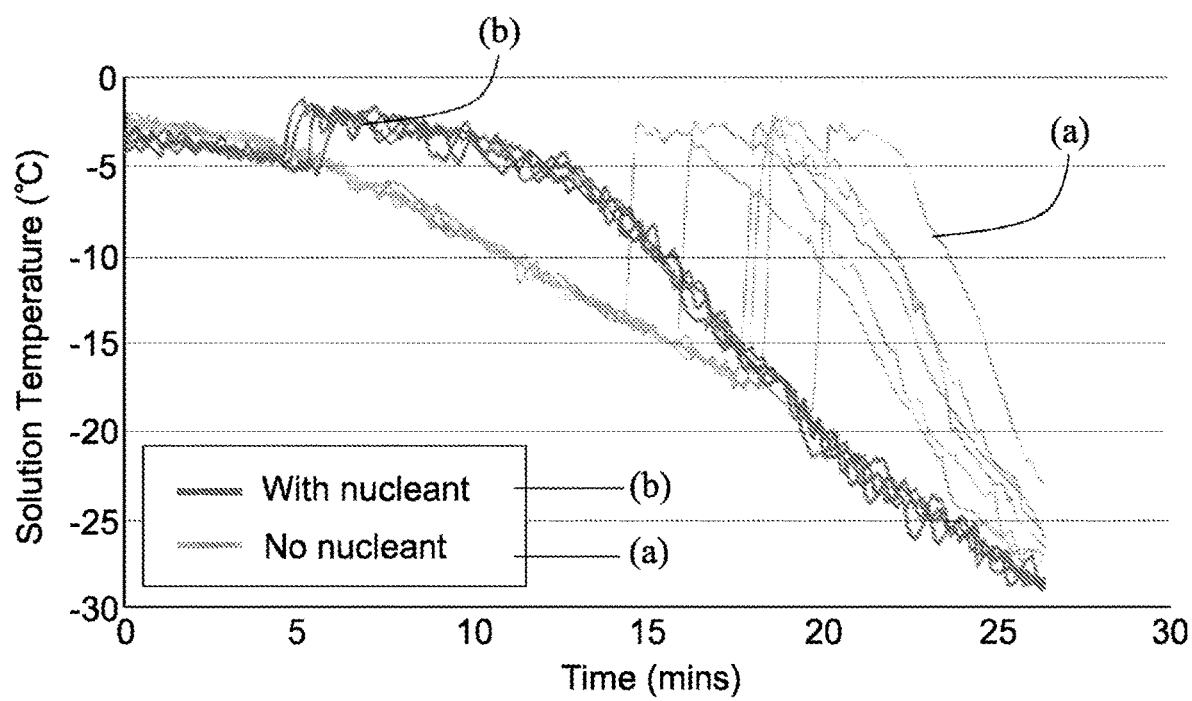
FIG. 10 is a graph showing temperature of a solution versus time for (a) multiple separate samples containing no ice nucleating material, and (b) the same samples with the addition of an ice nucleating material.

FIG. 10 is a graph showing temperature of a solution versus time for (a) multiple separate samples containing no ice nucleating material, and (b) multiple separate samples containing an ice nucleating material. As can be seen for (a), spontaneous spikes in the temperature of the samples occur at varying times, and the spikes are typically in the order 10 to 15° C. Such rapid shifts in the temperature of the sample are known to lead to poor sample viability following freezing and thawing.

The traces labelled (b) represent results achieved using the ice nucleating apparatus of the present invention. As can be seen, the amplitude of the spikes in temperature observed during the cooling stage is lower compared to the case where no ice nucleating apparatus is used. This explains why sample viability is improved when using the ice nucleating apparatus to induce ice nucleation.

After fabrication, the ice nucleating apparatus of any of the above described embodiments is packaged into a suitable container, which is sealed. The whole packaging, as well as the ice nucleating apparatus, is sterilised, particularly since the apparatus may be used to freeze biological materials—the sterilisation prevents contamination. Gamma sterilisation is preferred because it is well suited to sterilising large quantities of items at once. In embodiments where the ice nucleating material is a feldspar material, gamma sterilisation is suitable as feldspar is not adversely affected by gamma sterilisation.

To maximise the effectiveness of the ice nucleating apparatus, a suitable freezing, thawing and recovery process is required.

For biological samples, a cryoprotectant is often used to shield the cells during the freezing process, such as DMSO or glycerol. The cryoprotectant would typically make up 5% of the sample which is frozen.

Within a container containing the sample (e.g. a container, vial, or well), it is advisable to use the minimum volume possible while still covering the ice nucleating material. For example, in a 96 well plate, the volume of one well is 400 microlitres, but may only require filling to, for example 70 microlitres, to enable the sample to contact the ice nucleating apparatus and substantially saturate the ice nucleating material (i.e. substantially fill the cavity of the apparatus with ice nucleating material and fluid from the sample). It will be understood that any fill volume that enables the ice nucleating material to be substantially saturated by fluid from the sample may be used, and that generally speaking, this is less than the volume of the well.

After the freezing and thawing process, the cryoprotectant has a mildly toxic effect so the biological samples are often 'washed'. The cryoprotectant is diluted down and then removed. By filling the vessel with the smallest possible volume before freezing, the toxic cryoprotectant can be diluted down quickly with a high ratio of water to sample. The diluted liquid is then removed and this 'dilute and remove' step can be repeated if required.

Once the biological sample has been added to a container (e.g. a vial or a well of a multiwell plate), the ice nucleating apparatus can be added. This remains in place during and after the freezing process. It is only removed and disposed of after thawing, which may be days or years later. In embodiments, the ice nucleating devices are single-use devices.

The ice nucleating device works most effectively with the "VIA Freeze" equipment manufactured by Asymptote Limited. Traditional freezing equipment blows cold gas over the sample which causes samples on the outside to cool down faster. The VIA Freeze systems cool by conduction on the underside of the sample and every sample experiences the same cooling profile.

The freezing protocol programmed within the VIA Freeze system has several aspects to maximise the effectiveness of the ice nucleating apparatus:

A hold period a few degrees below the theoretical freezing point to absorb the energy release from the latent heat of fusion. For example, if the theoretical freezing point is −3° C., a hold period at −10° C. for 8 minutes may be included in the freezing programme.

The cooling rate beyond the freezing transition is critical and depends on the nature of the sample being frozen. This may be, for example, 0.3° C./min for some cells or 2° C./min for others. Control of ice nucleation is critical to safely cryopreserve the sample but the sample may still be ruined if the cooling rate after freezing is excessively fast or slow.

Once frozen to, for example −80° C. or −100° C., the samples can be removed from the VIA Freeze system and placed in long term frozen storage.

The samples preferably thaw at a sufficient speed to protect the biological sample. Typically, the frozen sample should be fully thawed within ten minutes.

Further embodiments of the present invention are set out in the following numbered clauses:

1. A device which contains a material which nucleates ice contained within a vessel, some walls of the vessel are permeable to water. The ice nucleant within the device is in contact with the solution surrounding the cells but is prevented from contaminating the biological material with particulates.

2. A device as described in clause 1 where the ice nucleating material may include, but not limited to the bacterium *Pseudomonas syringae*, crystalline cholesterol, encapsulated silver iodide and feldspar, in any physical form.

3. A device as described in clause 1 where the nucleating agent is held in contact with a sample solution without contaminating the biological media within said sample solution by means of, but not limited to:
   a. A dividing barrier with a hole in it
   b. A dividing barrier with a series of holes in it
   c. A dividing barrier wholly or partly made from a wicking or sponge material
   d. A dividing barrier wholly or partly made from filter or membrane material
   e. A dividing barrier wholly or partly made from a hydrophilic filter or membrane material 4. A device as described in clause 1 where the freezing agent is permanently part of the sample vessel 5. A device as described in clause 1 where the freezing agent can be separated from the sample vessel 6. A device as described in clause 1 where the sample vessel may be a test tube, vial, straw, multiwell plate or bag.

7. A device as described in clause 1 where multiple, independent doses of the freezing agent may be handled as if one part so multiple samples can be processed in parallel e.g. a 96 multiwell plate.

8. A device as described in clause 7 in which the ice nucleant is held near to the coldest part of the sample.

9. In one embodiment, the freezing agent is a powder held in a chamber which incorporates a membrane material allowing liquid and gas exchange while trapping the powder.

10. A device as described in the above clause, where the chamber is a separate part from the sample vessel and can be removed.

11. A device as described in the above clause, where multiple doses of the freezing agent are linked in one part and can be used with multiple samples in parallel.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from the any inventive concept as defined in the appended claims.

The invention claimed is:

1. An apparatus for performing ice nucleation, the apparatus comprising:
a housing, the housing comprising a first material layer forming a permeable housing wall and a second material layer opposing the first material layer, the first material layer and the second material layer defining a cavity therebetween;
an ice nucleating material encapsulated within the cavity; and
a multiwell plate, the multiwell plate comprising:
a plurality of wells, and
a plurality of integrated housings,
wherein each integrated housing of the plurality of integrated housings is integrated into a respective well of the plurality of wells, and
wherein the housing is one of the plurality of integrated housings integrated into a respective well of the plurality of wells.

2. The apparatus as claimed in claim 1, wherein the permeable housing wall is a first permeable housing wall, and wherein the second material layer forms a second permeable housing wall.

3. The apparatus as claimed in claim 2, wherein the housing is formed of a permeable material layer having a first portion and a second portion, wherein the first portion of the permeable material layer comprises the first material layer, and wherein the second portion of the permeable material layer comprises the second material layer.

4. The apparatus as claimed in claim 1, wherein the housing comprises a housing body, wherein the cavity is provided between the housing body and the permeable housing wall.

5. The apparatus as claimed in claim 2, wherein the housing comprises a housing body,
wherein the housing body is a disc comprising a through hole, the through hole forming the cavity, and
wherein the first permeable housing wall is provided over the through hole and bonded to a first surface of the housing body, and the second permeable housing wall is provided over the through hole and bonded to a second surface of the housing body, to encapsulate the ice nucleating material within the cavity.

6. The apparatus as claimed in claim 1 further comprising a stem coupled to the housing.

7. The apparatus as claimed in claim 1 further comprising a stem having a first end and a second end, wherein the first end is coupled to the housing and the second end is coupled to a lid for a container.

8. The apparatus as claimed in claim 1, wherein the second material layer forms an integrated wall, wherein the permeable housing wall is an integrated permeable housing wall, and wherein the cavity is an integrated cavity.

9. The apparatus as claimed in claim 8, wherein the integrated wall is formed from at least a portion of a side wall of the well.

10. The apparatus as claimed in claim 8, wherein the integrated wall is formed from at least a base wall of the well.

11. The apparatus as claimed in claim 1, wherein the apparatus comprises an insert plate for a multiwell plate that has a plurality of wells, the insert plate comprising:
a plurality of legs arranged in an array, each leg having a first, proximal end coupled to the insert plate and extending from a surface of the insert plate; and
a plurality of feet, wherein each foot is coupled to a second, distal end of the leg,
wherein a foot of the plurality of feet comprises the housing.

12. The apparatus as claimed in claim 11, wherein the insert plate is coupleable to a multiwell plate to provide the plurality of feet in a plurality of wells of the multiwell plate and thereby deliver ice nucleating material into each well.

13. The apparatus as claimed in claim 11, wherein the insert plate further comprises a plurality of holes arranged in an array, wherein each leg is coupled to the insert plate in proximity to a hole.

14. The apparatus as claimed in claim 11, wherein each foot of the plurality of feet comprises a respective integrated housing of the plurality of integrated housings.

15. The apparatus as claimed in claim 14, wherein each integrated housing of the plurality of integrated housings comprises at least one air vent hole.

16. The apparatus of claim 1, wherein the permeable housing wall is not permeable to the ice nucleating material.

* * * * *